United States Patent
Bialik et al.

(10) Patent No.: US 10,014,740 B2
(45) Date of Patent: Jul. 3, 2018

(54) CHAMBER FOR CONDUCTORS OF ELECTRIC MACHINES

(71) Applicant: ALSTOM Technology Ltd, Baden (CH)

(72) Inventors: Janusz Bialik, Nussbaumen (CH); Laurent Didier Jean Clemence, Danjoutin (FR); Duncan Madle, Valdoie (FR); Jean-Noel Simon, Phaffans (FR); Cristian Ana, Bucharest (RO)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 228 days.

(21) Appl. No.: 14/715,921

(22) Filed: May 19, 2015

(65) Prior Publication Data

US 2015/0340918 A1 Nov. 26, 2015

(30) Foreign Application Priority Data

May 26, 2014 (EP) .................................... 14169872

(51) Int. Cl.
*H02K 3/22* (2006.01)
*H02K 9/00* (2006.01)
*H02K 15/04* (2006.01)
*B23K 1/00* (2006.01)
*H02K 15/00* (2006.01)

(52) U.S. Cl.
CPC ............. *H02K 3/22* (2013.01); *B23K 1/0016* (2013.01); *H02K 9/005* (2013.01); *H02K 15/0093* (2013.01); *H02K 15/04* (2013.01)

(58) Field of Classification Search
CPC ...... H02K 3/22; H02K 9/005; H02K 15/0093; H02K 15/04
USPC ..................................................... 310/54, 201
See application file for complete search history.

(56) References Cited

U.S. PATENT DOCUMENTS

| | | | | |
|---|---|---|---|---|
| 3,955,110 | A * | 5/1976 | Karlen ..................... | H02K 3/22 310/54 |
| 4,801,832 | A * | 1/1989 | Neumann ............ | H02K 17/205 310/184 |
| 4,912,831 | A | 4/1990 | Levino | |
| 5,402,026 | A * | 3/1995 | Gertmar ................... | H02K 1/32 310/182 |
| 6,102,105 | A | 8/2000 | Moran et al. | |

(Continued)

FOREIGN PATENT DOCUMENTS

| EP | 0724326 A1 | 7/1996 |
|---|---|---|
| EP | 1 524 754 A1 | 4/2005 |

(Continued)

*Primary Examiner* — Forrest M Phillips
(74) *Attorney, Agent, or Firm* — GE Global Patent Operation; Rita D. Vacca

(57) ABSTRACT

The present disclosure relates to a chamber for housing strands of a stator bar for electric machines.

The problem to provide a reliable chamber for a stator bar of an electric machine is solved with a stator bar chamber engaging a stator bar in an electric machine. The chamber includes a number of hollow conductors in a first straight part of the chamber, a number of hollow conductors in a second tapered part, and a number of hollow conductors and adjacent solid conductors in a third straight part. The first part of the chamber is closed with a ring mounted at the edge of the first part and a nipple adapted to the ring.

6 Claims, 3 Drawing Sheets

(56) References Cited

U.S. PATENT DOCUMENTS

| | | |
|---|---|---|
| 8,448,839 B1 | 5/2013 | Rakozy et al. |
| 2002/0079773 A1* | 6/2002 | Butman .................... H02K 3/22 |
| | | 310/201 |
| 2004/0108786 A1* | 6/2004 | Niimi ..................... H02K 13/08 |
| | | 310/201 |
| 2005/0248229 A1* | 11/2005 | Even ........................ H02K 3/28 |
| | | 310/180 |
| 2006/0066167 A1* | 3/2006 | Saito ........................ H02K 3/12 |
| | | 310/201 |
| 2006/0108357 A1 | 5/2006 | Wang |
| 2006/0160389 A1 | 7/2006 | Rowe et al. |
| 2007/0051779 A1 | 3/2007 | Mall et al. |
| 2007/0158397 A1 | 7/2007 | Breznak et al. |
| 2011/0194891 A1 | 8/2011 | Bresney |
| 2016/0134177 A1* | 5/2016 | Itoh ......................... H02K 9/12 |
| | | 105/59 |

FOREIGN PATENT DOCUMENTS

| | | |
|---|---|---|
| EP | 1 658 917 A1 | 5/2006 |
| EP | 1731257 A1 | 12/2006 |
| EP | 1749611 A1 | 2/2007 |
| JP | H07308038 A | 11/1995 |
| JP | 2009254027 A | 10/2009 |

\* cited by examiner

CHAMBER FOR CONDUCTORS OF ELECTRIC MACHINES

CROSS-REFERENCE TO RELATED APPLICATIONS

This application claims priority to European application 14169872.0 filed May 26, 2014, the contents of which are hereby incorporated in its entirety.

TECHNICAL FIELD

The present disclosure relates to a chamber for housing strands of a stator bar for electric machines.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor, or also other types of electric machines.

BACKGROUND

Electric motors or generators have generally a core stator consisting of magnetic thin iron laminations, usually between 0.35 and 0.5 mm thickness, which form the annular assembly. The stator core is usually secured to an external casing, the latter firmly fixed to the machine foundation. The stator core may consist of lamination packets separated by radial ventilation ducts. Other designs can require axial ducts for the same purpose of cooling. On the surface of the stator core, slots are equally spaced, generally having a rectangular shape. The stator winding is laid down in these slots. Typically one or two bars or coils are present in every slot. The rotor is generally coaxial with the stator and is magnetically coupled to the stator. The rotor comprises a rotor body and a rotor winding, the latter generally fixed within rotor slots. The stator winding is generally connected to a 3-phase electric grid, whereas the rotor winding is usually fed by an external source to produce the magnetic field necessary for electromagnetic induction. The rotor speed can be either synchronous or asynchronous with respect to the armature magnetic field. Electrical power is generated from the armature winding. The bars or coils comprise a kernel, which is generally constituted by a plurality of copper strands, each insulated from the others, and an outer layer of insulation which can be specifically designed for high voltages. The stator winding is generally firmly fixed into the corresponding slots by wedges and other means, like lateral, radial wedges, filler strips and resin, to reduce the winding vibrations thus preventing insulation damages and slot discharges. There are several different stator bars technologies, depending mainly on the generator power output. It is differentiated between direct and indirect cooling designs by gas and/or by a cooling medium. The commonly today used cooling medium is de-ionized water. The connection between the stator bars has mainly two tasks, to lead the current and to lead the cooling medium. It is recommended to separate the electrical and hydraulic circuits to increase the bar to bar connection reliability, thus the whole generator reliability. To this end hollow conductors and water boxes from stainless steel have been introduced in which the two current and hydraulic circuits are split. However, today many generator bars still are equipped with hollow conductors from copper and can be replaced with stainless steel solutions only if complete stator rewind will be offered. Moreover, many machines suffer from cooling medium leaks especially if the brazing of some stator bars elements is not done properly or if the special prevent design is not put in place to mitigate design weaknesses. Therefore a solution is required to split both circuits and thus assure the certain water box reliability and tightness. Cooling medium leakage can occur which will lead to reduced cooling capabilities of the stator bars or the cooling medium will start the corrosion of the Cu-hollow conductors, finally leading to a reduced generator lifetime.

SUMMARY OF INVENTION

It is an object of the invention to provide a reliable chamber for a stator bar of an electric machine.

This object is solved with the features of the independent claims 1 and 6.

These and further aspects are attained by providing a stator bar chamber and a method for manufacturing of a stator bar chamber in accordance with the accompanying claims. The invention discloses a device and method to facilitate the generator manufacturing process of the stator bars with the hollow conductors and mitigate the risk of losing the tightness of the connections between stator bars. The device and method is mainly used in the area of repair of electric machines, where partial windings are replaced and single stator bars are replaced.

The problem is solved with a stator bar chamber engaging a stator bar in an electric machine, the chamber encompassing a number of hollow conductors in a first straight part of the chamber, a number of hollow conductors in a second tapered part, and a number of hollow conductors and adjacent solid conductors in a third straight part, whereas the first part of the chamber is closed with a ring mounted at the edge of the first part and a nipple adapted to the ring. The problem is further solved with a manufacturing method for a stator bar chamber comprising the steps of arranging a number of hollow conductors in a first straight part of the chamber, arranging the number of hollow conductors in a second tapered part of the chamber, and arranging the number of hollow conductors and adjacent solid conductors in a third straight part of the chamber, closing the first part of the chamber with a ring by mounting the ring at the edge of the first part and adapting a nipple to the ring.

Advantageously, the ring is made from copper and the nipple is made from stainless steel.

In a further example of the invention an essential part or the whole part of the first part is brazed in a first brazing zone to thereby electrically connect the hollow conductors and an essential part or the whole part of the third part is brazed in a second brazing zone to thereby create a watertight part.

BRIEF DESCRIPTION OF DRAWINGS

Further characteristics and advantages will be more apparent from the description of a preferred but non-exclusive embodiment of the chamber, illustrated by way of non-limiting example in the accompanying drawings, in which.

With reference to the figures like reference numerals designate identical or corresponding parts throughout the several views.

DETAILED DESCRIPTION

Figure 1:
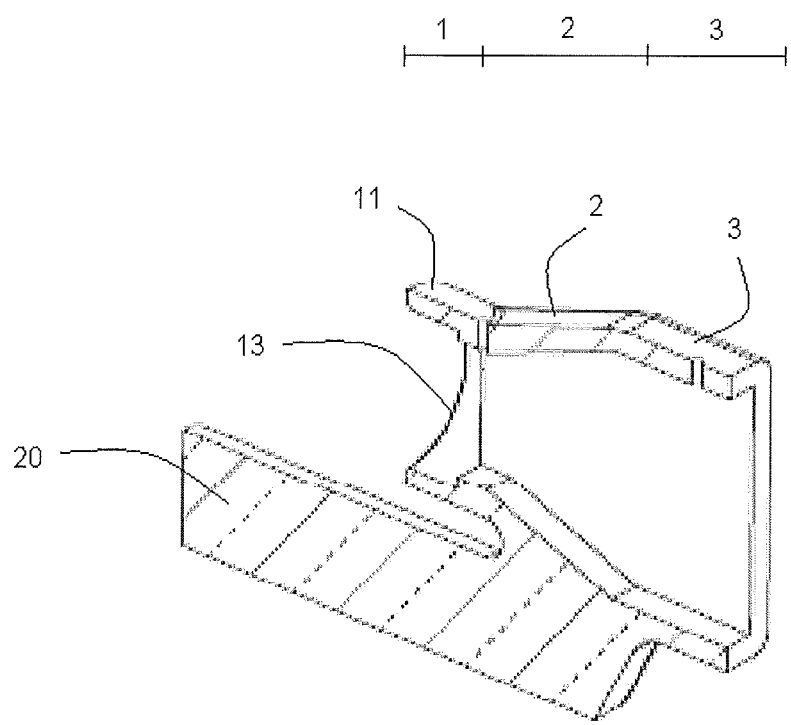
FIG. 1 shows a perspective sectional view of a part of a stator bar chamber with a connection part for connecting the chamber with other adjacent chambers, and a first, second, and third part of the opened chamber projecting from the connection part.

FIG. 1 shows a perspective sectional view of a part of a chamber 10 suitable for encompassing a stator bar 12 in a stator slot of an electric machine. Below a connecting part 20 can be seen for connecting the chamber 10 with other adjacent chambers (not shown). The chambers 10 are designed for housing stator bars 12 which are fitted into slots in a stator of the electric machine. The chamber 10 comprises a first part 1 above the connecting part 20 in the view shown which first part 1 has a cut opening 13 at the rear and an essentially open side in the direction to a second part 2. The first part 1 has a protruding part 11 protruding along the first part 1 beyond the cut opening 13. The protruding part 11 is made from copper, the other parts 1, 2, 3 may also be made from copper. The first part 1 and the second part 2 of the chamber 10 are manufactured in one-piece. Through the cut opening 13 of the first part 1 several conductors 14, 16 are to be passed as is described below. The first part 1 has a rectangular shape and lies parallel to the connection part 20. The second part 2 has a tapered cross-section with a wider cross-section in the direction to a third part 3. The third part 3 has a rectangular cross-section broader than the first part 1 and is connected with the first part 1 and the second part 2 in one piece. Together the first part 1, second part 2, and third part 3, which parts are divided as shown by the line above the part of the chamber 10, form a cone. The third part 3 is designed to house a stator bar 12 for a stator of an electric machine.

Figure 2:
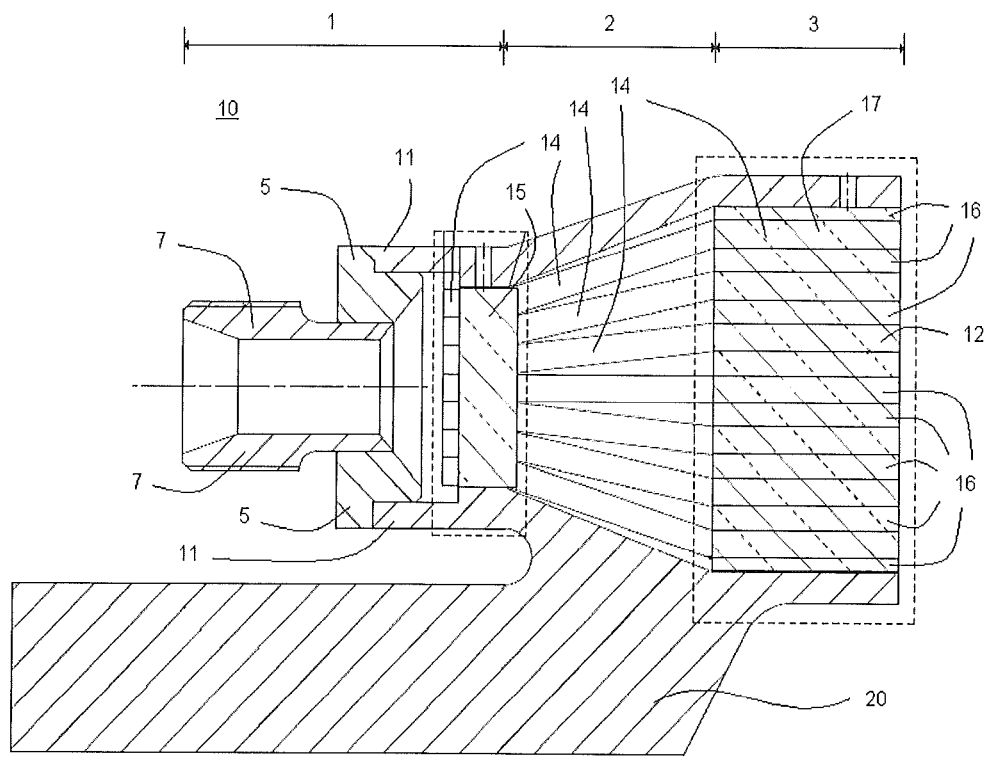
FIG. 2 shows a cross-sectional side view of the stator bar chamber with hollow conductors and solid conductors arranged and the first part of the chamber abut by a ring in which a nipple is fitted.

FIG. 2 shows a cross-sectional side view of the stator bar chamber 10 similar to FIG. 1. Here, hollow conductors 14 and solid conductors 16 are placed in the chamber 10. Hollow conductors 14 are arranged side by side in the first part 1 serving for transporting a cooling medium through the hollow conductors 14 for cooling the stator bars 12. This means the stator bar 12 is composed of hollow conductors 14 and solid conductors 16. The hollow conductors 14 reach through the first part 1 for connection to a cooling medium supply (not shown). The hollow conductors 14 are brazed together in the first part 1 in an area of a brazing zone 15, shown with diagonal dashed and solid lines in FIG. 2. In the second part of the chamber 10 the hollow conductors 14 fan out and form a trapezoid in this cross-sectional side view. Accordingly, the cross-section of the chamber 10 is bigger at the end distant from the brazing zone 15 at the first part 1 than at the near end. The connection between the cooling medium stator bar chamber 10 or box and the manifolds of hollow conductors 14 in the second part 2 is made out of stainless steel material. The stainless steel assures the high mechanical resistance to the mechanical stresses, high resistance to corrosion as well as resistance to the magnetic field, which is very important in the end winding zones of the generators, where all the generator parts are exposed to the stray complex magnetic field. The second part 2 ends in the third part 3 which is shaped similar to the first part 1 with a rectangular cross-section but with a bigger height. In the third part 3 the hollow conductors 14 project in a direction essentially parallel to the connection part 20 and the first part 1. The hollow conductors 14 project through a stator bar 12 which is mainly manufactured by solid conductors 16. The hollow conductors 14 and the solid conductors 16 alternate in the third part 3 in an example of the invention. The hollow conductors 14 and the solid conductors 16 can also have a different distribution, e.g. with a majority of solid conductors 16. The hollow conductors 14 and the solid conductors 16 of the stator bar 12 within the third part 3 of the chamber 10 are commonly brazed together in a second brazing zone 17. The conductors 14, 16 hereby are made from copper which is easily to be brazed. As can be seen in FIG. 2 the stator bar chamber 10 engages the stator bar 12 and surrounds the stator bar 12 completely except at the open side at the right in this view directed away from the chamber 10. The stator bar 12 is tightly arranged and to be fitted into a slot of the stator. The first part 1 has a protruding part 11 at its edge far from the other parts 2, 3. At the left side in FIG. 2 the protruding part 11 has a rectangular shape in the cross-section shown, the protruding part 11 projects along the whole rectangular edge of the first part 1. The protruding part 11 engages into a ring 5 which is fitted to the chamber 10 in a way to create a tight connection, especially for water. The ring 5 which is in this example made from copper is usually brazed to the first part 1 via the protruding part 11 to establish a solid connection. The ring 5 leaves an opening into which a nipple 7 is fitted. The nipple 7 can be coupled to the chamber 10 without a further connection means, without brazing or similar, in a form closure. An alternative connection method between the copper ring 5 and the stainless steel nipple 7 is brazing. The outer cross-section of the nipple 7 is fit to the inner cross-section of the ring 5 to this end. The nipple 7 has a smaller cylindrical shape in the area of connection to the opening of the ring 5 and a broader shape at the outer end as shown in FIG. 2. The nipple 7 is further shown in FIG. 3. The nipple 7 is in one example manufactured from stainless steel. Water tightness is very crucial in generators equipped with the copper hollow conductors 14, where the link copper to stainless steel elements exist. Therefore, the invention allows the splitting of the electrical and the hydraulic circuit within the bar to bar connection, thus increasing generator parts reliability as well as the reliability of the complete electric machine. The solution discloses an improved stator direct cooled bar-to-bar design, the connection of the stator bars 12 towards each other, and improves the manufacturing process. An example of the stator bar chamber 10 and the method to manufacture is briefly described. The chamber 10 represents a copper water box or chamber 10 together with the bi-metallic composition 8, which is made of the copper ring 5 and the stainless steel nipple 7. There are two brazing zones, the first brazing zone 15 and the second brazing zone 17, which allow the separation of the current circuit from the hydraulic circuit and as well to increase the tightness of the chamber 10. The inventional chamber 10 described by way of example assures as well that the copper strands of the stator bars 12 will not corrode due to the contact with the cooling medium. The second brazing zone 17 represents the current circuit lead, whereas the first brazing zone 15 assures the tightness of the chamber 10. The brazing of the ring 5 to the protruding part 11 closes the hydraulic connection of the chamber 10 and the hydraulic connection to the external cooling circuit (not shown), which feeds the cooling medium to the chamber 10. The external cooling circuit connects several chambers 10 with each other and therewith several stator bars 12. The external cooling circuit can comprise coolant hoses to transport the cooling medium.

To avoid that the brazing connection of one of the designed brazing zones 15, 17 breaks, the brazing process consist of three steps as follows. In the first step the bi-metallic composition 8 is brazed, the copper ring 5 to the stainless steel nipple 7. In the second step the conductors of the stator bar 12, commonly made from solid copper strands and a copper hollow conductor 14, are brazed to the chamber 10 simultaneously. In the last third step the nipple 7 is brazed to the protruding part 11 of the first part 1 of the chamber 10. Due to the presented improved chamber 10 and bi-metallic composition 8 and the proposed sequence of brazing, the risk of de-braze of the copper conductors 14, 16 of the stator bar 12 from the chamber 10 is reduced. Furthermore, the corrosion of copper strands of the stator bar 12 is mitigated due to the fact that the electrical circuit and the hydraulic circuit are separated. The solution described here presents the improvement of the chamber 10, also referred to as cooling medium box, to cool a stator bar 12 with the bi-metallic composition 8, applicable to the stator bars 12 with copper hollow conductors 14. Thus, generator life time and reliability is increased.

Figure 3:
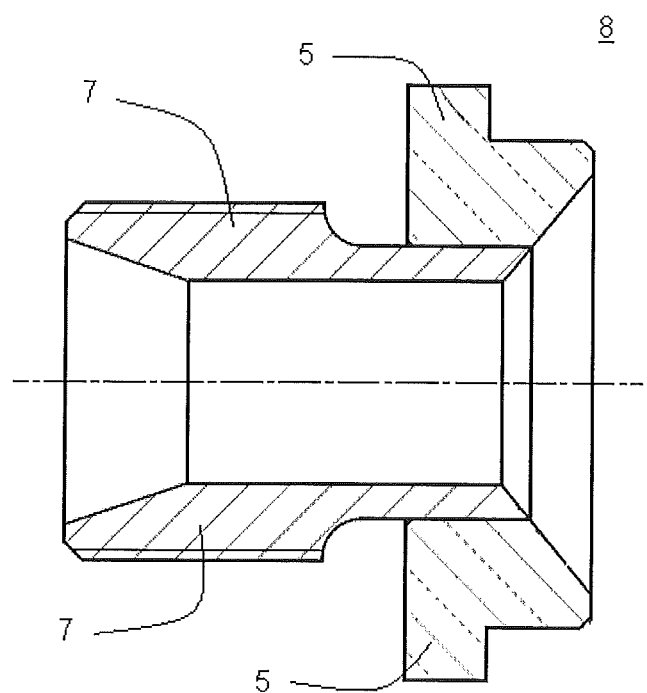
FIG. 3 shows a cross-sectional side view of the ring and the nipple according to FIG. 2 to be mounted to the chamber according to FIG. 1 and FIG. 2.

FIG. 3 shows a cross-sectional side view of the ring 5 and the nipple 7 according to FIG. 2 to be mounted to the chamber according to FIG. 1 and FIG. 2. Shown is the connection of the nipple 7 made from stainless steel to the ring 5 from copper for example. A connection of copper and stainless steel is hard to establish due to the different chemical composition of both materials. If the connection of copper with stainless steel is not properly done the cooling chamber 10 will lose its tightness and corrosion of the chamber 10 will occur leading to a reduced generator, parts lifetime. The chamber 10 is hereby not fabricated from stainless steel which means a reliable braze connection between the part 11 and the ring 5 can be established.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. A stator bar chamber engaging a stator bar in an electric machine, the chamber comprising:
   an interior area defined by the chamber for housing conductors within the interior area;
   a number of hollow conductors housed within a first straight part of the chamber, housed within a second tapered part of the chamber, and housed within a third straight part of the chamber;
   a number of solid conductors housed within the third straight part of the chamber adjacent the number of hollow conductors;
   a ring mounted with a portion of the ring within the first straight part of the chamber and a portion of the ring abutting an outer free end of the first straight part of the chamber;
   a nipple comprising a connection portion with an outer cross-section of the connection portion connected within and to an inner cross-section of the ring;
   a first brazing zone in a part or in a whole of the first straight part of the chamber with brazing electrically connecting the number of hollow conductors; and
   a second brazing zone in a part or in a whole of the third straight part of the chamber with brazing creating a watertight third straight part of the chamber.

2. The stator bar chamber according to claim 1, wherein the ring is made from copper and the nipple is made from stainless steel.

3. The stator bar chamber according to claim 1, wherein the ring is brazed to the outer free end of the first straight part of the chamber.

4. A bi-metallic composition comprising a ring from one metal and a nipple from a different metal connected to a stator bar chamber according to claim 1.

5. A manufacturing method for a stator bar chamber comprising:
   providing an interior area defined by the chamber for housing conductors;
   arranging a number of hollow conductors within a first straight part of the chamber;
   arranging the number of hollow conductors within a second tapered part of the chamber;
   arranging the number of hollow conductors and adjacent solid conductors within a third straight part of the chamber;
   connecting to the first straight part of the chamber a ring with a first portion of the ring arranged within the first straight part of the chamber and a second portion of the ring abutting an outer free end of the first straight part of the chamber; and
   connecting to the ring a nipple comprising a connection portion with an outer cross-section sized to connect within and to an inner cross-section of the ring.

6. The method according to claim 5, further comprising:
   brazing the ring to the nipple;
   brazing the number of hollow conductors and adjacent solid conductors to the third straight part of the chamber; and
   brazing the brazed nipple and ring to the first straight part of the chamber.

* * * * *